US012671278B2

(12) United States Patent (10) Patent No.: US 12,671,278 B2
Saito et al. (45) Date of Patent: Jun. 30, 2026

(54) STATOR CORE, STATOR, ROTARY ELECTRIC MACHINE, AND METHOD OF MANUFACTURING STATOR CORE

(71) Applicants: Sumitomo Electric Industries, Ltd., Osaka (JP); Sumitomo Electric Sintered Alloy, Ltd., Takahashi (JP)

(72) Inventors: Tatsuya Saito, Osaka (JP); Tomoyuki Ueno, Osaka (JP)

(73) Assignees: Sumitomo Electric Industries, Ltd., Osaka (JP); Sumitomo Electric Sintered Alloy, Ltd., Takahashi (JP)

( * ) Notice: Subject to any disclaimer, the term of this patent is extended or adjusted under 35 U.S.C. 154(b) by 197 days.

(21) Appl. No.: 18/572,208

(22) PCT Filed: Apr. 15, 2022

(86) PCT No.: PCT/JP2022/017933
§ 371 (c)(1),
(2) Date: Dec. 20, 2023

(87) PCT Pub. No.: WO2022/270135
PCT Pub. Date: Dec. 29, 2022

(65) Prior Publication Data
US 2024/0235283 A1 Jul. 11, 2024

(30) Foreign Application Priority Data

Jun. 21, 2021 (JP) ................................. 2021-102187

(51) Int. Cl.
*H02K 1/14* (2006.01)
*H02K 1/02* (2006.01)
(Continued)

(52) U.S. Cl.
CPC ............... *H02K 1/146* (2013.01); *H02K 1/02* (2013.01); *H02K 15/022* (2013.01); *H02K 21/24* (2013.01)

(58) Field of Classification Search
CPC ........... H02K 1/02; H02K 1/14; H02K 1/146; H02K 1/148; H02K 15/02; H02K 15/022; H02K 21/24
(Continued)

(56) References Cited

U.S. PATENT DOCUMENTS 8,736,135 B2 * 5/2014 Asano .................... H02K 1/182
310/216.057
9,160,219 B2 * 10/2015 Takamatsu ............... H02K 1/12
(Continued)

FOREIGN PATENT DOCUMENTS

JP     2001-307914 A     11/2001
JP     2009-259991 A     11/2009
(Continued)

*Primary Examiner* — Alex W Mok
(74) *Attorney, Agent, or Firm* — XSENSUS LLP

(57) ABSTRACT
A stator core configured to have a plurality of teeth each including a peripheral surface and a first end surface, wherein each of the plurality of teeth is formed of a dust core, the dust core includes a plurality of coated particles, and each of the plurality of coated particles includes a metallic particle and an electrically insulating coating, and wherein each of the first end surfaces has first regions formed of cross sections of the metallic particles and second regions formed of the electrically insulating coatings between the first regions, each of the peripheral surfaces is made of an oxide containing a constituent element of the soft magnetic material, an average thickness of the oxide in each of the peripheral surfaces is 10 μm or less, and a difference between a maximum value and a minimum value of a first heights is 0.02 mm or less.

11 Claims, 8 Drawing Sheets

(51) Int. Cl.
    *H02K 15/02*        (2025.01)
    *H02K 15/022*     (2025.01)
    *H02K 21/24*       (2006.01)

(58) Field of Classification Search
    USPC ................................................. 310/216.066
    See application file for complete search history.

(56)                          References Cited

U.S. PATENT DOCUMENTS

| | | | | |
|---|---|---|---|---|
| 10,103,655 | B2 * | 10/2018 | Horiuchi | B60L 50/51 |
| 10,903,700 | B2 * | 1/2021 | Igarashi | H02K 1/02 |
| 2007/0241622 | A1 * | 10/2007 | Toyoda | H02K 1/02 |
| | | | | 310/44 |
| 2009/0072647 | A1 * | 3/2009 | Hino | H02K 1/276 |
| | | | | 903/906 |
| 2013/0278104 | A1 * | 10/2013 | Komuro | H01F 1/08 |
| | | | | 310/156.01 |
| 2016/0311019 | A1 * | 10/2016 | Ye | B22F 1/10 |
| 2019/0214860 | A1 | 7/2019 | Igarashi et al. | |
| 2020/0195112 | A1 * | 6/2020 | Miyamoto | G01D 5/202 |

FOREIGN PATENT DOCUMENTS

| | | | | | |
|---|---|---|---|---|---|
| JP | 2011077223 | A | * | 4/2011 | H01F 1/0596 |
| JP | 5130270 | B2 | * | 1/2013 | H01F 41/0293 |
| JP | 2017-508874 | A | | 3/2017 | |
| JP | 2017-229191 | A | | 12/2017 | |
| WO | 2015/092002 | A1 | | 6/2015 | |

* cited by examiner

STATOR CORE, STATOR, ROTARY ELECTRIC MACHINE, AND METHOD OF MANUFACTURING STATOR CORE

CROSS-REFERENCE TO RELATED APPLICATIONS

The present application is based on PCT filing PCT/JP2022/017933, filed on Apr. 15, 2022, which claims priority from Japanese Patent Application No. 2021-102187, filed on Jun. 21, 2021, the entire contents of each are incorporated herein by reference.

TECHNICAL FIELD

The present disclosure relates to a stator core, a stator, a rotary electric machine, and a method of manufacturing a stator core.

BACKGROUND ART

PTL 1 discloses an axial-gap rotary electric machine. An axial-gap rotary electric machine includes a rotor and a stator. The rotor and the stator are disposed opposite to each other in the axial direction of the rotor. The stator includes a stator core and a plurality of coils.

The stator core includes a yoke and a plurality of teeth. The yoke is a member having an annular plate-like shape. Each tooth is a columnar member protruding in the axial direction of the yoke. Each tooth is spaced apart from each other in the circumferential direction of the yoke. Each coil is disposed at each tooth.

The stator core is formed of a dust core in which the yoke and the teeth are integrally formed. The dust core is made of a plurality of coated particles that are compression-molded. The coated particle includes a metallic particle made of a soft magnetic material and an electrically insulating coating covering the metallic particle.

CITATION LIST

Patent Literature

PTL 1: Japanese Unexamined Patent Application Publication No. 2017-229191

SUMMARY OF INVENTION

A stator core of the present disclosure is a stator core configured to be used in an axial-gap rotary electric machine, the stator core includes a plurality of teeth with columnar shape arranged annularly. The stator core has a peripheral surface of each of the plurality of teeth, a first end surface of each of the plurality of teeth, at least one second end surface that is a surface opposite to the first end surfaces. Each of the plurality of teeth is formed of a dust core. The dust core includes a plurality of coated particles. Each of the plurality of coated particles includes a metallic particle made of a soft magnetic material, and an electrically insulating coating covering the metallic particle. Each of the first end surfaces has first regions formed of cross sections of the metallic particles, and second regions formed of the electrically insulating coatings between the first regions. Each of the peripheral surfaces is made of an oxide containing a constituent element of the soft magnetic material. An average thickness of the oxide in each of the peripheral surfaces is 10 μm or less. When lengths between each of the first end surfaces and the second end surface are defined as a plurality of first heights, a difference between a maximum value and a minimum value of the plurality of first heights is 0.02 mm or less.teeth A stator of the present disclosure is a stator of an axial-gap rotary electric machine, and includes the stator core of the present disclosure, and coils disposed at each of the plurality of teeth.

A rotary electric machine of the present disclosure is an axial-gap rotary electric machine including the stator of the present disclosure.

A method of manufacturing a stator core of the present disclosure includes forming a powder compact by compacting a plurality of coated particles, heat-treating the powder compact, and grinding the heat-treated powder compact. Each of the plurality of coated particles includes a metallic particle made of a soft magnetic material, and an electrically insulating coating covering the metallic particle. The powder compact includes a plurality of columnar teeth arranged annularly. Each of the plurality of teeth has a peripheral surface and a first end surface. A pressure applied when the compacting is performed is 500 MPa or more. The heat-treating is performed under a condition of a temperature of 350° C. to 800° C. in an oxidizing atmosphere. An oxygen concentration in the oxidizing atmosphere is 20,000 ppm or less in terms of volume ratio. The grinding is performed on the first end surface of each of the plurality of teeth in the heat-treated powder compact and is not performed on the peripheral surface of each of the plurality of teeth.

DETAILED DESCRIPTION

Figure 1:
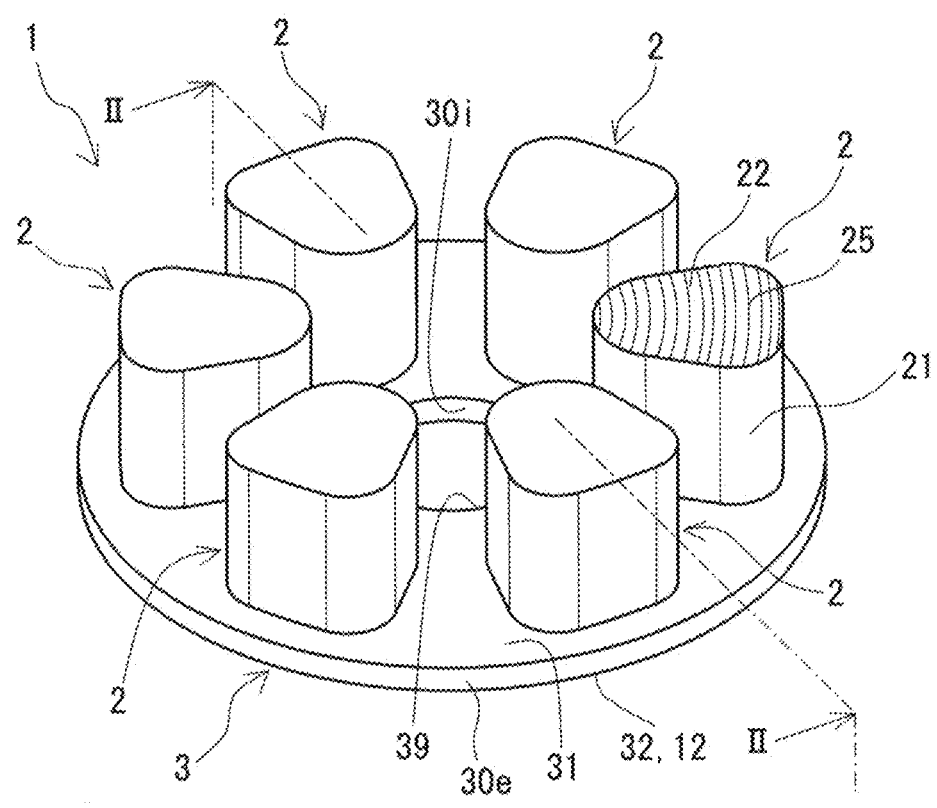
FIG. 1 is a schematic perspective view showing an example of a stator core according to a first embodiment.

Problems to be Solved by Present Disclosure

It is desired to develop a stator core capable of constructing an axial-gap rotary electric machine with low noise, low vibration, and low loss.

An object of the present disclosure is to provide a stator core and a stator capable of constructing an axial-gap rotary electric machine with low noise, low vibration, and low loss. Another object of the present disclosure is to provide an axial-gap rotary electric machine with low noise, low vibration, and low loss. One of the other object of the present disclosure is to provide a method of manufacturing a stator core capable of manufacturing a stator core that can construct an axial-gap rotary electric machine with low noise, low vibration, and low loss.

Advantageous Effects of Present Disclosure

The stator core of the present disclosure and the stator of the present disclosure can construct an axial-gap rotary electric machine with low noise, low vibration, and low loss.

The rotary electric machine of the present disclosure has low noise, low vibration, and low loss.

The method of manufacturing a stator core of the present disclosure can manufacture a stator core that can construct an axial-gap rotary electric machine with low noise, low vibration, and low loss.

Description of Embodiments of Present Disclosure

The inventors have examined causes of an increase in noise and vibration and causes of an increase in loss in an axial-gap rotary electric machine. As a result, the following was found.

A stator core formed of a dust core is manufactured by compacting a plurality of coated particles as described above. In the as-compacted stator core, the height between a lower surface of a yoke and an end surface of each tooth may not be uniform. When the difference between a maximum value and a minimum value of the height is large, in the axial-gap rotary electric machine, the difference between a maximum length and a minimum length of a gap between a rotor and the end surface of each tooth is large. When the difference between the maximum length and the minimum length of the gap is large, noise and vibration of the rotary electric machine are increased.

When the end surface of each tooth is ground in order to reduce the difference between the maximum value and the minimum value of the height, an electrically insulating coating of the coated particles in the vicinity of the end surface is damaged. Due to the grinding, the metallic particles of the coated particles in the vicinity of the end surface flow. The metallic particles exposed due to damage to the electrically insulating coating may be connected to adjacent exposed metallic particles by flowing. When metallic particles are connected to each other, the loss increases due to an increase in eddy current loss.

As a result of intensive studies on a method of manufacturing a stator core, the inventors have obtained the following findings. By performing steps in a specific order of heat-treating a powder compact formed by compacting a plurality of coated particles under specific conditions and then grinding, it is possible to reduce the number of portions where metallic particles are connected to each other as described above.

The present invention is based on the above findings. First, embodiments of the present disclosure will be listed and explained.

(1) A stator core according to one aspect of present disclosure is a stator core configured to be used in an axial-gap rotary electric machine, the stator core includes a plurality of teeth with columnar shape arranged annularly. The stator core has a peripheral surface of each of the plurality of teeth, a first end surface of each of the plurality of teeth, at least one second end surface that is a surface opposite to the first end surfaces. Each of the plurality of teeth is formed of a dust core. The dust core includes a plurality of coated particles. Each of the plurality of coated particles includes a metallic particle made of a soft magnetic material, and an electrically insulating coating covering the metallic particle. Each of the first end surfaces has first regions formed of cross sections of the metallic particles, and second regions formed of the electrically insulating coatings between the first regions. Each of the peripheral surfaces is made of an oxide containing a constituent element of the soft magnetic material. An average thickness of the oxide in each of the peripheral surfaces is 10 μm or less. When lengths between each of the first end surfaces and the second end surface are defined as a plurality of first heights, a difference between a maximum value and a minimum value of the plurality of first heights is 0.02 mm or less.

The stator core can construct an axial-gap rotary electric machine with low loss. In each first end surface, adjacent metallic particles are not connected to each other. In the stator core having the first end surface, when the rotary electric machine is constructed, an eddy current loss caused by the metallic particles being connected to each other is easily reduced. In addition, in the dust core in which an average thickness of the oxide in the peripheral surface is 10 μm or less, an increase in hysteresis loss is easily suppressed when the rotary electric machine is constructed. This is because when the average thickness of the oxide in the peripheral surface is 10 μm or less, the amount of oxide that increases the hysteresis loss is small. Therefore, the stator core can easily reduce the loss of the rotary electric machine.

The stator core is easy to construct an axial-gap rotary electric machine with low noise and vibration. This is because in the stator core having the difference of 0.02 mm or less, when the rotary electric machine is constructed, the gaps between the first end surface of each tooth and the magnets provided in the rotor can be easily made uniform. The rotary electric machine having the uniform gap can easily reduce torque ripple. The rotary electric machine having a small torque ripple can easily reduce noise and vibration. Therefore, the stator core can easily reduce noise and vibration of the rotary electric machine.

(2) The stator core according to the above (1) may further include a yoke with annular plate-like shape. The yoke may have an inner peripheral surface, an outer peripheral surface, an upper surface connected to the inner peripheral surface, the outer peripheral surface, and the peripheral surfaces of the plurality of teeth, and a lower surface connected to the inner peripheral surface and the outer peripheral surface. The lower surface may be the second end surface. The yoke may be formed of the dust core integrally formed with the plurality of teeth.

The stator core is suitable for reducing the loss of a double-stator single-rotor rotary electric machine or a single-stator single-rotor rotary electric machine among axial-gap rotary electric machines.

(3) In the stator core according to the above (1) or (2), a parallelism between the first end surface and the second end surface of each of the plurality of teeth may be 0.02 mm or less.

The stator core is easy to construct an axial-gap rotary electric machine with low noise and vibration. This is because in the stator core having the parallelism of 0.02 mm or less, when the axial-gap rotary electric machine is constructed, the gaps between the first end surface of each tooth and the magnet of the rotor can be easily made uniform.

(4) In the stator core according to any one of the above (1) to (3), a relative density of the dust core may be 90% or more.

The dust core having a relative density of 90% or more easily improves magnetic properties such as a saturation magnetic flux density. The dust core having a relative density of 90% or more can easily improve mechanical properties such as strength.

(5) In the stator core according to any one of the above (1) to (4), the first end surface of each of the plurality of teeth may have a third region between the second regions, the third region being made of the oxide containing the constituent element of the soft magnetic material. An average depth of each of the third regions may be 100 μm or more.

Since the first end surface of the stator core has the third region, it is easier to prevent adjacent metallic particles from being connected to each other. Since the average depth of the third region is 100 μm or more, it is particularly easy to prevent adjacent metallic particles from being connected to each other. Therefore, the stator core can easily reduce the eddy current loss when the rotary electric machine is constructed.

(6) In the stator core according to any one of the above (1) to (5), the metallic particles may be made of pure iron or an iron-based alloy. The iron-based alloy may be an Fe—Si-based alloy, an Fe—Al-based alloy, or an Fe—Si—Al-based alloy.

Metallic particles made of pure iron have a high saturation magnetic flux density. Therefore, the dust core having metallic particles made of pure iron is likely to improve the saturation magnetic flux density. In addition, the metallic particles made of pure iron have excellent formability. Therefore, the dust core having metallic particles made of pure iron is likely to increase the relative density.

Metallic particles made of an iron-based alloy can easily reduce iron loss such as eddy current loss. Therefore, the dust core having the metallic particles made of the iron-based alloy can easily reduce the loss.

(7) A stator according to one aspect of present disclosure is a stator of an axial-gap rotary electric machine, the stator includes the stator core according to any one of the above (1) to (6) and coils disposed at each of the plurality of teeth.

Since the stator includes the stator core, an axial-gap rotary electric machine with low noise, low vibration, and low loss can be constructed.

(8) A rotary electric machine according to one aspect of the present disclosure is an axial-gap rotary electric machine includes the stator according to the above (7).

Since the rotary electric machine includes the stator, noise and vibration are low, and loss is low.

(9) A method of manufacturing a stator core according to one aspect of present disclosure includes forming a powder compact by compacting a plurality of coated particles, heat-treating the powder compact, and grinding the heat-treated powder compact. Each of the plurality of coated particles includes a metallic particle made of a soft magnetic material, and an electrically insulating coating covering the metallic particle. The powder compact includes a plurality of columnar teeth arranged annularly. Each of the plurality of teeth has a peripheral surface and a first end surface. A pressure applied when the compacting is performed is 500 MPa or more. The heat-treating is performed under a condition of a temperature of 350° C. to 800° C. in an oxidizing atmosphere. An oxygen concentration in the oxidizing atmosphere is 20,000 ppm or less in terms of volume ratio. The grinding is performed on the first end surface of each of the plurality of teeth in the heat-treated powder compact and is not performed on the peripheral surface of each of the plurality of teeth.

The method of manufacturing a stator core can manufacture a dust core capable of constructing an axial-gap rotary electric machine with low-loss. In the method of manufacturing a dust core, a powder compact heat-treated under specific conditions is ground. An oxide containing a constituent element of the metallic particles is formed in the first end surface and the peripheral surface of the powder compact by heat-treatment under a specific condition. By grinding after the heat-treatment, the vicinity of the first end surface of the powder compact is ground. It is considered that a load due to sliding during the grinding is easily suppressed by the oxide. Therefore, adjacent metallic particles can be prevented from being connected to each other. The peripheral surface of the powder compact is not ground by the grinding after the heat-treatment. That is, the method of manufacturing a dust core may manufacture the dust core described above. When the oxygen concentration is 20,000 ppm or less, an increase in hysteresis loss due to oxidation is easily suppressed.

(10) As one aspect of the method of manufacturing a stator core according to the above (9), the oxygen concentration in the oxidizing atmosphere may be 500 ppm or more in terms of volume ratio.

When the oxygen concentration is 500 ppm or more, it is easy to manufacture the stator core having the above-described first end surface and peripheral surface.

(11) As one aspect of the method of manufacturing a stator core according to the above (9) or (10), the grinding may be surface grinding.

It is easy to manufacture the stator core having the above-described first end surface by surface grinding.

DETAILS OF EMBODIMENTS OF PRESENT DISCLOSURE

The details of embodiments of the present disclosure are set forth in the description below. The same reference numerals in the drawings denote the same components.

First Embodiment

[Stator Core]

Figure 2:
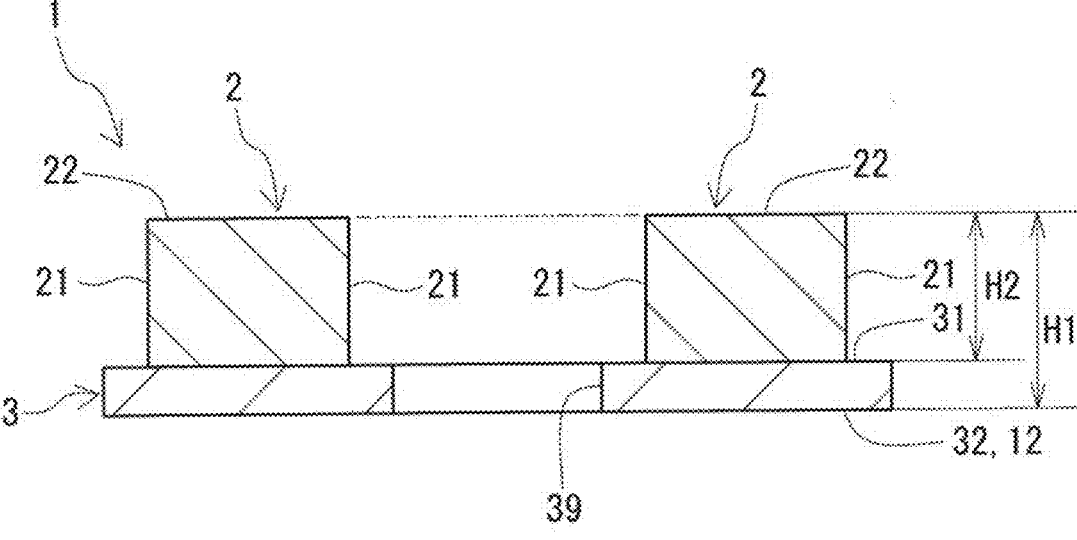
FIG. 2 is a II-II sectional view of a dust core of FIG. 1.

A stator core 1 according to the first embodiment will be described with reference to FIGS. 1 to 7. As shown in FIG. 1, stator core 1 of the embodiment includes a yoke 3 having an annular plate-like shape and a plurality of teeth 2 with columnar shape. Yoke 3 and the plurality of teeth 2 are formed of an integrally formed dust core. The dust core is an aggregate of a plurality of coated particles 10 shown in FIGS. 3 and 4. Each coated particle 100 includes a metallic particle 101 and an electrically insulating coating 102. Electrically insulating coating 102 covers metallic particles 101. One of the features of stator core 1 of the embodiment is to satisfy the following requirements (a) and (b). (a) Stator core 1 has a specific peripheral surface 21 shown in FIG. 4, a specific first end surface 22 shown in FIG. 3, and a second end surface 12 that is a surface opposite to first end surface 22. (b) The difference between a maximum value and a minimum value of a first heights H1 of stator core 1 shown in FIG. 2 is in a specific range.

[Yoke]

As shown in FIG. 1, yoke 3 magnetically couples adjacent teeth 2 among teeth 2 arranged in the circumferential direction of yoke 3. The shape of yoke 3 is an annular plate-like shape. Yoke 3 has an inner peripheral surface 30*i*, an outer peripheral surface 30*e*, a planar upper surface 31, and a planar lower surface 32. Upper surface 31 is connected to inner peripheral surface 30*i*, outer peripheral surface 30*e*, and peripheral surfaces 21 of teeth 2 to be described later. Lower surface 32 is connected to inner peripheral surface 30*i* and outer peripheral surface 30*e*. Lower surface 32 is second end surface 12 of stator core 1. The term upper and lower as used herein means that of the two surfaces of yoke 3 facing each other, the surface having teeth 2 is referred to as an upper surface, and the surface having no teeth 2 is referred to as a lower surface. As will be described later with reference to FIG. 11, when a rotary electric machine 9 is constructed using stator core 1, this term upper and lower does not necessarily coincide with the term upper and lower of rotary electric machine 9. Yoke 3 has a shaft hole 39 passing through upper surface 31 and lower surface 32 at the center thereof.

Upper surface 31 is not ground as shown in the method of manufacturing a stator core described later. Upper surface 31 which is not ground is made of a layered oxide 211*a* similarly to peripheral surface 21 which will be described later with reference to FIG. 4. Lower surface 32 may be ground as shown in the method of manufacturing a stator core to be described later or may not be ground similarly to upper surface 31. When grinding is performed, the difference between a maximum value and a minimum value of first heights H1, which will be described later with reference to FIG. 2, becomes small. Ground lower surface 32 has the same configuration as that of first end surface 22 described below with reference to FIG. 3. Ground lower surface 32 is provided with a grinding mark. The grinding marks provided on lower surface 32 is similar to grinding marks 25 shown in FIG. 1. Grinding marks 25 will be described later. As will be described later with reference to FIG. 11, when rotary electric machine 9 is constructed using stator core 1 of the embodiment, lower surface 32 comes into contact with the inner surface of a case 92 shown in FIG. 11.

[Tooth]

Figure 10:
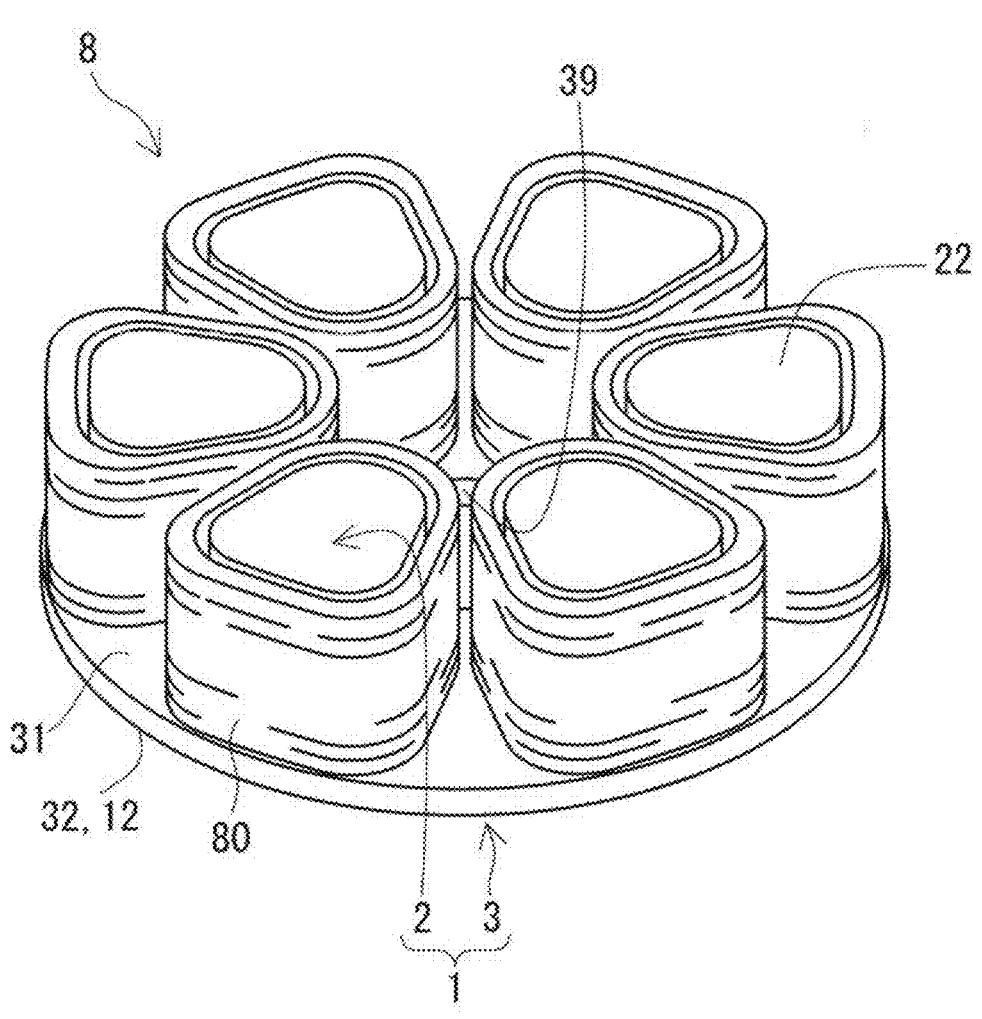
FIG. 10 is a schematic perspective view showing an example of a stator according to a third embodiment.

When constructing a stator 8 described later with reference to FIG. 10, tooth 2 is provided with a coil 80. The number of teeth 2 is plural. The specific number of teeth 2 can be appropriately selected. FIG. 1 shows stator core 1 with six teeth 2.

A plurality of teeth 2 are arranged on a circumference as shown in FIG. 1. Each tooth 2 is arranged at predetermined interval in the circumferential direction of yoke 3. In the embodiment, each tooth 2 is arranged at equal interval in the circumferential direction of yoke 3. Each tooth 2 is connected to upper surface 31. Each tooth 2 and yoke 3 of the embodiment is formed of a dust core which is integrally formed. A gap to be a magnetic gap is not generated between yoke 3 and each tooth 2. Therefore, the magnetic flux satisfactorily passes from each tooth 2 to yoke 3.

Each tooth 2 has the same shape and size. The shape of each tooth 2 is square columnar or circular columnar. The term square columnar or circular columnar refers to a polygonal shape or circular shape cross section taken along a plane perpendicular to the axial direction of tooth 2. The axial direction of tooth 2 is a direction perpendicular to lower surface 32. The polygonal shape is, for example, a triangle or a quadrangle. The triangle is, for example, an equilateral triangle or an isosceles triangle. The quadrangle is, for example, a trapezoid or a rectangle. The circular shape is, for example, a perfect circle or an ellipse. The polygonal shape and the circular shape include not only a geometrical rectangular shape and a geometrical circular shape but also a range regarded as a substantially rectangular shape and a substantially circular shape. The polygonal shape includes, for example, a shape having rounded corners. The cross section shape is uniform in the axial direction of tooth 2. Each of teeth 2 may be formed in a tapered shape that is tapered toward the tip.

The shape of tooth 2 of the embodiment is trapezoidal columnar. The cross section shape of tooth 2 of the embodiment is trapezoidal. The cross section shape of tooth 2 of the embodiment is uniform in the axial direction of tooth 2. Tooth 2 having a trapezoidal columnar shape can easily achieve a large cross sectional area. Tooth 2 having a trapezoidal columnar shape can easily reduce the dead space of stator core 1 and can easily construct stator 8 having a high space factor.

Each tooth 2 has peripheral surface 21 and first end surface 22. Peripheral surface 21 is a surface surrounding the periphery of the axis of tooth 2. The axis of tooth 2 is an axis parallel to the axis of stator core 1 and passing through the centroid of first end surface 22 of tooth 2. The axis of stator core 1 is an axis passing through the center of an inscribed circle or a circumscribed circle of a plurality of teeth 2 arranged on the circumference. The axis of stator core 1 coincides with the rotary shaft of a rotor 90 which will be described later. Peripheral surface 21 is a surface connected to first end surface 22 and upper surface 31. First end surface 22 is a surface connected to the upper end portion of peripheral surface 21. The upper end portion of peripheral surface 21 is located on opposite side of the portion connected to upper surface 31.

[First End Surface]

Each first end surface 22 is ground as shown in the method of manufacturing a stator core described below. Due to the grinding, the difference between a maximum value and a minimum value of first heights H1, which will be described later with reference to FIG. 2, is small. Each ground first end surface 22 is provided with grinding marks 25, as shown in FIG. 1. In FIG. 1, grinding marks 25 are exaggerated on one first end surface 22 for convenience of explanation. In FIG. 1, grinding marks provided on other first end surface 22 are omitted. Grinding marks 25 are streaky irregularities generated during grinding. The lines of grinding marks 25 are formed along the relative moving direction of first end surface 22 and a grinder 400 shown in FIG. 7 during grinding. Unlike each first end surface 22, peripheral surface 21 is not ground.

Figure 3:
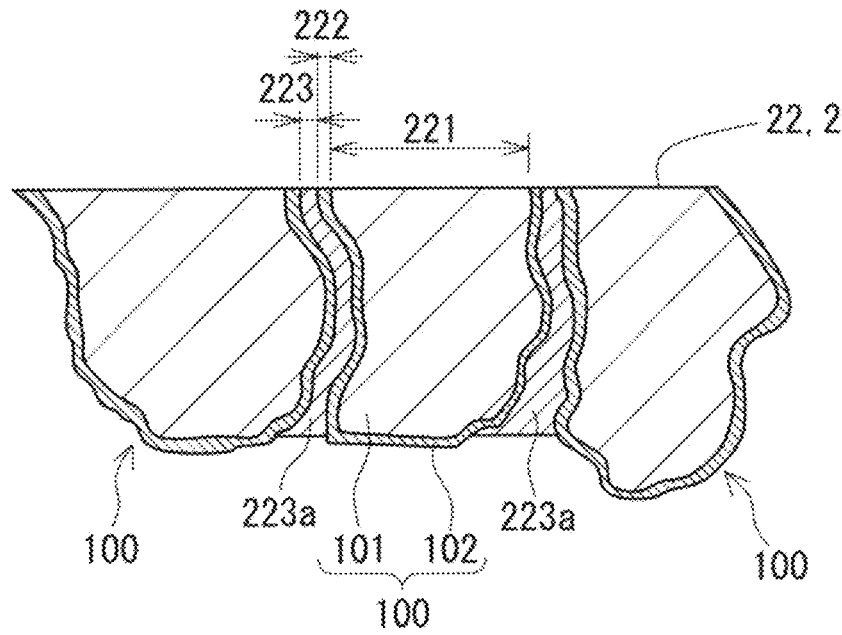
FIG. 3 is a schematic sectional view schematically showing the vicinity of a first end surface of a tooth included in the stator core according to the first embodiment.

As shown in FIG. 3, first end surface 22 has first regions 221 and second regions 222. First end surface 22 may further include third regions 223.

First region 221 is formed of a cross section of metallic particles 101. That is, first region 221 is formed of a region of each metallic particle 101 that is exposed from electrically insulating coating 102. When first end surface 22 is viewed in a plan view, first regions 221 are a large number of island-shaped regions arranged in a dispersed manner with intervals therebetween.

Second region 222 is formed of a cross section of electrically insulating coating 102. Second region 222 is a region adjacent to first region 221 between first regions 221. That is, second region 222 is in contact with first region 221. When first end surface 22 is viewed in a plan view, second regions 222 are a plurality of annular regions covering the periphery of each first region 221. Second regions 222 adjacent to each other may be in contact with each other or may not be in contact with each other.

Third region 223 is a region between a plurality of coated particles 100, that is, a region between adjacent second regions 222. Third region 223 is provided at a position where adjacent second regions 222 are not in contact with each other. Third region 223 is normally terminated at a specific location in the depth direction from first end surface 22. That is, at a position deeper than the specific position, there are no third regions 223, but there are second regions 222. In a plan view of first end surface 22, third region 223 is a mesh-like region surrounding the periphery of each second region 222. Third region 223 is made of an oxide 223a. Oxide 223a contains constituent elements of metallic particle 101. The composition of oxide 223a is different from the composition of electrically insulating coating 102. Oxide 223a is an oxide of iron, for example. Specific oxides of iron are $Fe_2O_3$ or $Fe_3O_4$.

[Peripheral Surface]

Peripheral surface 21 is not ground. That is, peripheral surface 21 does not have grinding marks 25. Unlike first end surface 22, metallic particles 101 are not exposed from peripheral surface 21. Peripheral surface 21 is made of oxide 211a. That is, layered oxide 211a is provided between peripheral surface 21 and coated particle 100 closest to peripheral surface 21. The composition of oxide 211a is the same as that of oxide 223a. The term same as used herein means that constituent elements of the soft magnetic material are common oxides. The ratio between the constituent element and oxygen may be different between oxide 223a and oxide 211a. Oxide 223a is formed between coated particles 100 in the vicinity of peripheral surface 21.

The average thickness of layered oxide 211a is 10 μm or less. In stator core 1 in which the average thickness of oxide 211a is 10 μm or less, it is easy to prevent an increase in hysteresis loss. This is because when the average thickness of oxide 211a is 10 μm or less, the amount of oxide that increases hysteresis loss is small. The oxide that increases the hysteresis loss is an oxide having a high coercive force, such as $Fe_3O_4$. The average thickness of oxide 211a may even be 8 μm or less, in particular 6 μm or less. The lower limit value of the average thickness of oxide 211a is, for example, 0.5 μm. When the average thickness of oxide 211a is 0.5 μm or more, it is easy to mechanically protect electrically insulating coating 102 of coated particle 100 in the vicinity of peripheral surface 21. Therefore, even if coil 80 and peripheral surface 21 come into contact with each other when constructing stator 8 to be described later with reference to FIG. 10, electrically insulating coating 102 is less likely to be damaged. The average thickness of oxide 211a may further be 1.0 μm or more, particularly 2.0 μm or more. That is, the average thickness of oxide 211a may be 0.5 μm to 10 μm, further 1.0 μm to 8 μm, particularly 2.0 μm to 6 μm.

The average thickness of oxide 211a is obtained as follows. A cross section orthogonal to peripheral surface 21 is taken. The cross section is observed with an optical microscope. In the cross section, 100 or more observation fields are taken. Each of observation fields is set so as to include peripheral surface 21 and 5 or more coated particles

100 near peripheral surface 21. The size of each of observation fields is set to 450 μm×450 μm. In each field, the shortest distance between each coated particle 100 near peripheral surface 21 and peripheral surface 21 is measured. The average value of all the shortest lengths is defined as the average thickness of oxide 211a.

The average depth of oxide 223a is, for example, 10 μm or more. When the average depth is 100 μm or more, adjacent metallic particles 101 are more easily prevented from being connected to each other. Therefore, stator core 1 can easily reduce the eddy current loss when rotary electric machine 9 is constructed. The upper limit value of the average depth of oxide 223a is, for example, 1,000 μm. When the average depth of oxide 223a is 1,000 μm or less, an increase in loss can be suppressed. That is, the average depth of oxide 223a is 100 μm to 1,000 μm. The average depth of oxide 223a may further be 150 μm to 800 μm, particularly 200 μm to 600 μm.

The average depth of oxide 223a is obtained as follows. A cross section orthogonal to peripheral surface 21 is taken. The cross section is observed with an optical microscope. In the cross section, 20 or more observation fields are taken. Each observation field is set so that the entire length of oxide 223a in the depth direction is included in the field. The size of each observation field is set to 2,000 μm×2,000 μm. In each field, the length of each oxide 223a along the direction orthogonal to peripheral surface 21 is measured. The average value of all the measured lengths is defined as the average depth of oxide 223a.

[First Height]

Figure 11:
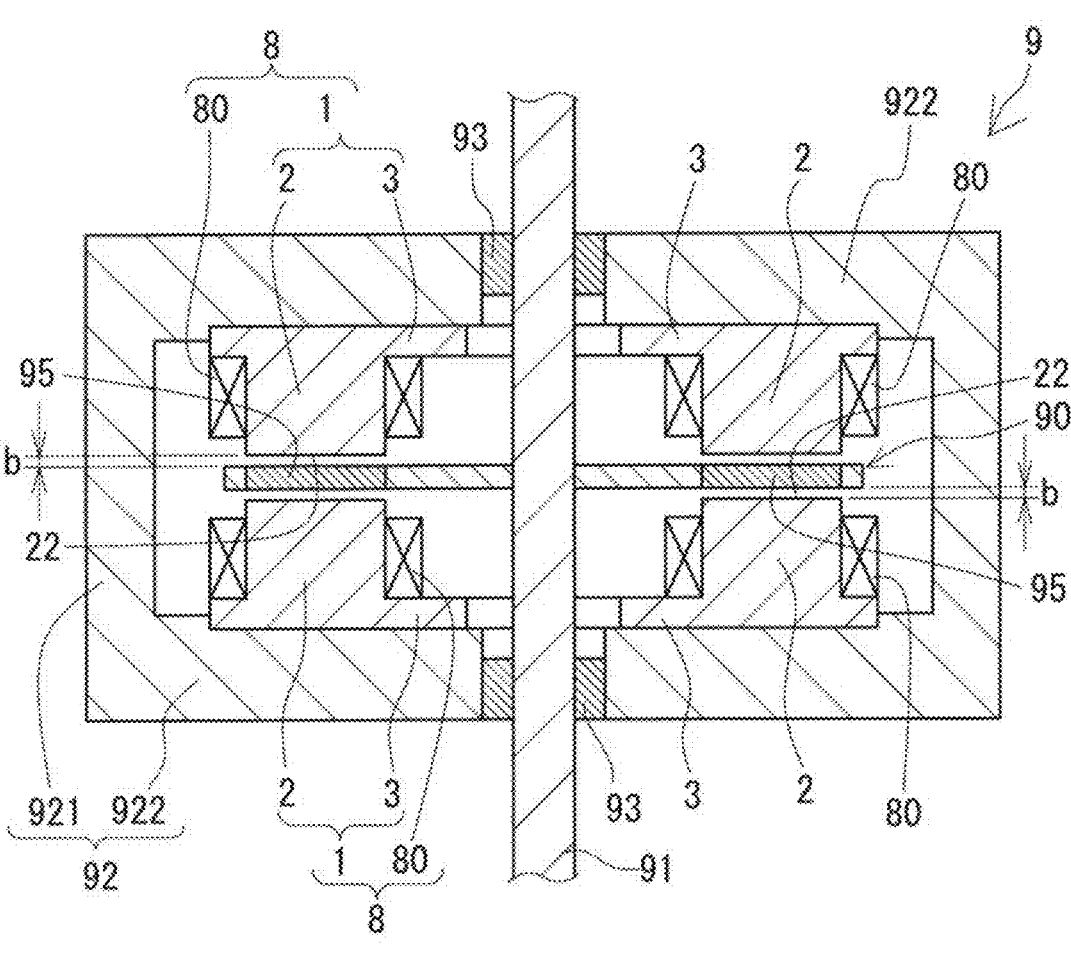
FIG. 11 is a schematic sectional view showing an example of a rotary electric machine according to a fourth embodiment.

The difference between a maximum value and a minimum value of first heights H1 shown in FIG. 2 is 0.02 mm or less. The difference of first heights H1 is a difference between the maximum value and the minimum value among a plurality of first heights H1. Each first height H1 is the length between lower surface 32 and each first end surface 22. In stator core 1 in which the difference of first heights H1 is 0.02 mm or less, when rotary electric machine 9 to be described later with reference to FIG. 11 is constructed, it is easy to make gaps b uniform. Each gap b is a length between each first end surface 22 and a magnet 95 of rotor 90. With this stator core 1, rotary electric machine 9 having a small torque ripple can be easily constructed. Rotary electric machine 9 having a small torque ripple can easily reduce noise and vibration. FIG. 11 shows gap b in an exaggerated manner for convenience of explanation. When the difference of first heights H1 is smaller, it is easier to make gap b uniform. The difference of first heights H1 may be 0.01 mm or less, further 0.008 mm or less, in particular 0.005 mm or less.

A micrometer is used to measure each first height H1. A plurality of measurement points is selected on each first end surface 22. The measurement point is set on a straight line drawn so as to pass through the centroid of first end surface 22 and the center of yoke 3 when first end surface 22 is viewed in a plan view. Three or more measurement points are selected on the straight line. In particular, the measurement point includes the centroid of first end surface 22, the first edge of first end surface 22, and the second edge of first end surface 22 on the straight line. The first edge of first end surface 22 is an edge at a position close to the center of yoke 3. The second edge of first end surface 22 is an edge at a position far from the center of yoke 3. Each first height H1 is an average value of lengths of straight lines connecting lower surface 32 and each measurement point among straight lines orthogonal to first end surface 22.

[Second Height]

The difference between a maximum value and a minimum value of second heights H2 shown in FIG. 2 may be 0.02 mm or less, similarly to first heights H1. The difference of second heights H2 is a difference between the maximum value and the minimum value among a plurality of second heights H2. Each second height H2 is a length between upper surface 31 and each first end surface 22. In stator core 1 in which the difference of second heights H2 is 0.02 mm or less, when stator 8 to be described later with reference to FIG. 10 and rotary electric machine 9 to be described later with reference to FIG. 11 are constructed, it is easy to appropriately dispose coils 80 at each tooth 2. In stator core 1 in which the difference of second heights H2 is 0.02 mm or less, it is easy to make the lengths of the magnetic circuits formed by each of teeth 2 uniform. When the difference of second heights H2 is smaller, it is easier to appropriately dispose coils 80 at each tooth 2. The difference of second heights H2 may be 0.01 mm or less, further 0.008 mm or less, in particular 0.005 mm or less.

Each second height H2 is obtained by "first height H1—thickness of yoke 3". A micrometer is used to measure the thickness of yoke 3. A plurality of measurement points is selected on upper surface 31. The measurement points are set on a straight line drawn so as to pass through the centroid of each first end surface 22 and the center of yoke 3 when stator core 1 is viewed in a plan view. Two or more measurement points are selected on the straight line. In particular, the measurement points include an inner peripheral edge of upper surface 31 and an outer peripheral edge of upper surface 31 on the straight line. The thickness of yoke 3 is an average value of lengths of straight lines connecting lower surface 32 and each measurement point among straight lines orthogonal to upper surface 31.

[Parallelism]

The parallelism between lower surface 32 and each first end surface 22 may be 0.02 mm or less. In stator core 1 in which the parallelism is 0.02 mm or less, when rotary electric machine 9 to be described later with reference to FIG. 11 is constructed, it is easy to make each of gaps b uniform. When the parallelism is smaller, it is easier to make gaps b uniform. The parallelism may be 0.01 mm or less, further 0.008 mm or less, particularly 0.005 mm or less.

The above-mentioned parallelism is obtained as follows. A height gauge equipped with a 0 grade surface plate is used. Stator core 1 is placed on a surface plate so that first end surfaces 22 faces upward. A plurality of measurement points are selected on each first end surface 22. The measurement points are set on a straight line drawn so as to pass through the centroid of first end surface 22 and the center of yoke 3 in when stator core 1 is viewed in a plan view. Three or more measurement points are selected on the straight line. The measurement points include the centroid of first end surface 22, the first edge of first end surface 22, and the second edge of first end surface 22 on the straight line. The parallelism between lower surface 32 and each first end surface 22 is defined as a difference between a maximum value and a minimum value of a length of a straight line connecting the surface plate and each measurement point among straight lines orthogonal to the surface plate.

[Size]

The size of yoke 3 and the size of each tooth 2 can be appropriately selected according to the specification of rotary electric machine 9. The size of yoke 3 includes an inner diameter, an outer diameter, a thickness, and the like. The size of each tooth 2 is a cross section product, a height, etc. The inside diameter of yoke 3 is 5 mm to 150 mm, for example. The outer diameter of yoke 3 is, for example, 30 mm to 300 mm. The thickness of yoke 3 is, for example, 1.0 mm to 10 mm, further 1.5 mm to 7.0 mm. The inner diameter of yoke 3 is the diameter of shaft hole 39. The cross section product of tooth 2 is, for example, 5 mm$^2$ to 800 mm$^2$. The height of teeth 2 is, for example, 3 mm to 50 mm. Here, the cross section product of tooth 2 is an area of the cross section cut by a plane orthogonal to the axial direction of tooth 2. Here, the height of each tooth 2 is each second height H2.

[Constituent Material]

The dust core is made of an aggregate of a plurality of coated particles 100 shown in FIG. 3. Coated particle 100 includes metallic particle 101 and electrically insulating coating 102.

(Metallic Particle)

Metallic particle 101 is made of a soft magnetic material. The soft magnetic material may be pure iron or iron-based alloy. Pure iron has a purity of 99% or more. That is, pure iron has an iron (Fe) content of 99% by mass or more. Metallic particle 101 made of pure iron has a high saturation magnetic flux density. Therefore, the dust core having metallic particles 101 made of pure iron is likely to improve the saturation magnetic flux density. In addition, metallic particle 101 made of pure iron has excellent formability. Therefore, the dust core having metallic particles 101 made of pure iron is likely to increase the relative density.

The iron-based alloy contains an additive element, and the balance is Fe and inevitable impurities. The iron-based alloy contains the largest amount of Fe. The iron-based alloy is, for example, at least one selected from the group consisting of an Fe—Si (silicon)-based alloy, an Fe—Al (aluminum)-based alloy, an Fe—Si—Al-based alloy, and an Fe—Ni (nickel)-based alloy. The Fe—Si-based alloy is, for example, silicon steel. The Fe—Si—Al-based alloy is, for example, sendust. The Fe—Ni based alloy is, for example, permalloy. The electrical resistance of iron-based alloys is larger than that of pure iron. Therefore, metallic particle 101 made of the iron-based alloy can easily reduce iron loss such as eddy current loss. Therefore, the dust core having metallic particles 101 formed of the iron-based alloy can easily reduce the loss. The dust core may include both metallic particles 101 made of pure iron and metallic particles 101 made of an iron-based alloy.

(Electrically Insulating Coating)

Electrically insulating coating 102 covers metallic particle 101. Electrically insulating coating 102 can reduce iron loss such as eddy current loss. The dust core with electrically insulating coating 102 can easily reduce losses. The material of electrically insulating coating 102 is, for example, an oxide such as phosphate, silica, magnesium oxide and aluminum oxide, or the like. Phosphate has excellent adhesiveness to metallic particle 101 and also has excellent deformability. Therefore, electrically insulating coating 102 made of phosphate is easily deformed following the deformation of metallic particle 101 described above and is less likely to be damaged in the step of manufacturing a powder compact in the method of manufacturing of a stator core described later. Therefore, such a dust core can easily reduce the loss.

An average thickness of electrically insulating coating 102 is, for example, 10 nm to 1000 nm. Electrically insulating coating 102 of 10 nm or more easily insulates adjacent metallic particles 101 from each other Electrically insulating coating 102 of 1000 nm or less can easily increase the relative density of the dust core. The average thickness of electrically insulating coating is further 20 nm to 700 nm, in particular 30 nm to 500 nm.

The average thickness of electrically insulating coating 102 is determined as follows. The cross section of stator core 1 is taken. The cross section is observed with a transmission electron microscope (TEM), and the observed image is analyzed to determine the cross section. In the cross section, 20 or more observation fields are taken. The magnification of each observation field is set to 50,000 times to 300,000 times. The average value of the thickness of each observation field is used to obtain the average value of all the observation fields, and the average value of all the observation fields is set as the average thickness of electrically insulating coating 102.

[Relative Density]

A relative density of the dust core may be 90% or more. The dust core having a relative density of 90% or more easily improves the saturation magnetic flux density. The dust core having a relative density of 90% or more can easily improve mechanical properties such as strength. The relative density may be 93% or more, or even 95% or more. The relative density may be 99% or less.

"Relative density of dust core" refers to the ratio (%) of the actual density of dust core to the true density of dust core. That is, the relative density of the dust core is obtained by [(actual density of dust core/true density of dust core)× 100]. The actual density of the dust core can be obtained by immersing the dust core in the oil to impregnate the dust core with the oil and calculating [oil-impregnated density× (mass of dust core before oil impregnation/mass of dust core after oil impregnation)]. The oil-impregnated density is (mass of dust core after impregnation/volume of dust core after impregnation). That is, the actual density of the dust core can be obtained by (mass of dust core before oil impregnation/volume of dust core after oil impregnation). The volume of the dust core after impregnation can typically be measured by a liquid displacement method. The true density of the dust core is a theoretical density on the assumption that the dust core has no voids.

[Method of Manufacturing Stator Core]

Stator core 1 according to the embodiment can be manufactured by a method of manufacturing a stator core including the following steps A to C. In the step A, powder compact is formed. In the step B, a heat-treated body is formed by heat-treating the powder compact. In the step C, a specific surface of the heat-treated body is ground.

[Step A]

The powder compact can be formed by compacting raw material powder.

The raw material powder includes a plurality of coated particles. The coated particle includes the metallic particle and the electrically insulating coating. The materials of the metallic particles and the electrically insulating coating are as described above. In the coated particles at the raw material stage, substantially the entire surface of the metallic particles is covered by the electrically insulating coating. The raw material powder may include a binder and a lubricant in addition to the coated particles. The lubricant may be applied to the inner peripheral surface of the die to be described later.

The average particle diameter of the metallic particles is, for example, 20 µm to 350 µm. The metallic particles having an average particle diameter within the above range are easy to handle and compact. The average particle diameter of the soft magnetic powder is further 40 µm to 300 µm, particularly 40 µm to 250 µm. The average particle diameter of the metallic particles is measured using a laser diffraction/scattering particle diameter/particle size distribution measuring apparatus, and is defined as a particle diameter at which the cumulative mass becomes 50% of the mass of all the particles.

For compacting the raw material powder, a press forming machine or the like can be used. The press forming machine includes a die, a core rod, an upper punch, and a lower punch. The die, the core rod and the lower punch form a cavity into which the raw material powder is filled. In the press forming machine, for example, forming is performed by an upper punch and a lower punch so that the yoke is located on the top and the teeth are located on the bottom. The inner peripheral surface of the die forms the outer peripheral surface of the yoke. The outer peripheral surface of the core rod forms the inner peripheral surface of the yoke. The lower punch has one first lower punch and a plurality of second lower punches. The shape of the first lower punch is cylindrical. The first lower punch has one first hole and a plurality of second holes. A core rod is provided in the first hole. The second lower punches are provided in each second hole. The end surface of the first lower punch forms the upper surface of the yoke. The inner peripheral surface of the second holes of the first lower punch forms the peripheral surfaces of each tooth. The shape of each second lower punch is columnar. The end surface of each second lower punch forms the first end surfaces of each tooth. The upper punch forms the lower surface of the yoke. The raw material powder is filled into the cavity by a powder feeder. The upper punch and the lower punch compact the raw material powder filled in the cavity.

A typical powder feeder reciprocates linearly over the die to feed powder into the cavity. In this powder feeder, the amount of raw material powder filled in a portion of the die where powder feeding is started is likely to be larger than the amount of raw material powder filled in a portion where the powder feeder turns back.

A powder compact including a yoke with annular plate shape and teeth with columnar shape is formed. The raw material powder in the cavity is compacted to form the powder compact. The height between the first end surface of the tooth and the lower surface of the yoke formed at a portion where powder feeding is started is likely to be higher than the height between the first end surface of the tooth and the lower surface of the yoke formed at a portion where the powder feeder turns back.

Figure 5:
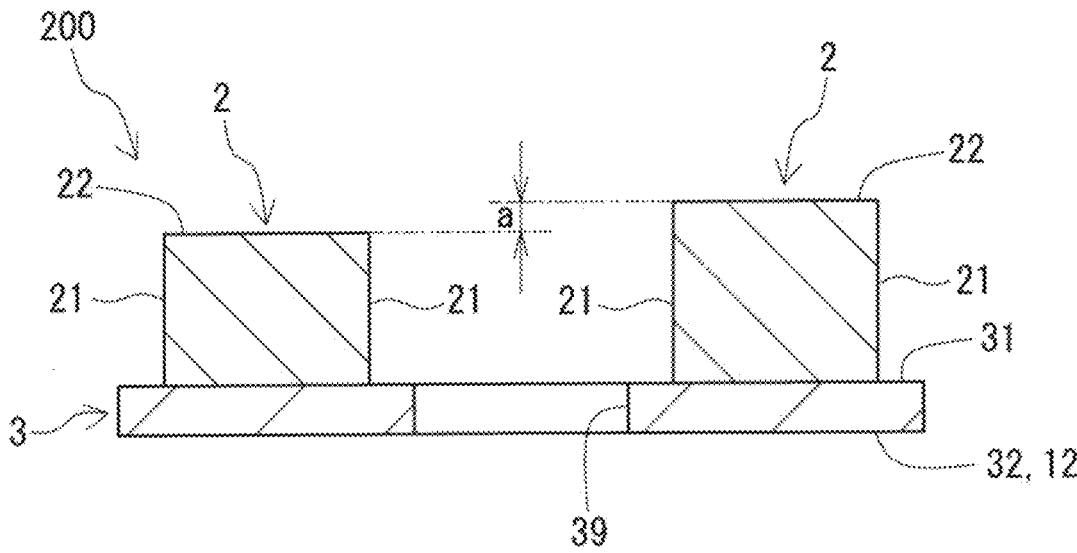
FIG. 5 is a schematic sectional view showing an example of a powder compact formed in a step A in a method of manufacturing a stator core according to the first embodiment.

Such a powder compact is shown in FIG. 5. A powder compact 200 of FIG. 5 shows an example in which the height between lower surface 32 of yoke 3 and first end surface 22 of the right tooth 2 is larger than the height between lower surface 32 of yoke 3 and first end surface 22 of the left tooth 2. As shown in FIG. 5, a difference a is likely to occur between right first end surface 22 and left first end surface 22.

The compacting pressure is, for example, 500 MPa or more. When the compacting pressure is 5(0) MPa or more, a dust core having a high relative density may be manufactured. The compacting pressure is, for example, 2000 MPa or less. When the compacting pressure is 2000 MPa or less, the electrically insulating coating of the coated particles is less likely to be damaged. The pressure during compacting is further 700 MPa to 1800 MPa, in particular 800 MPa to 1500 MPa.

[Step B]

The heat-treated body can be formed by heat-treating the powder compact. The temperature of the heat-treatment is, for example, 350° C. to 800° C. The holding time of the heat-treatment is, for example, 5 minutes to 60 minutes. The atmosphere in the heat-treatment is an oxidizing atmosphere.

Figure 4:
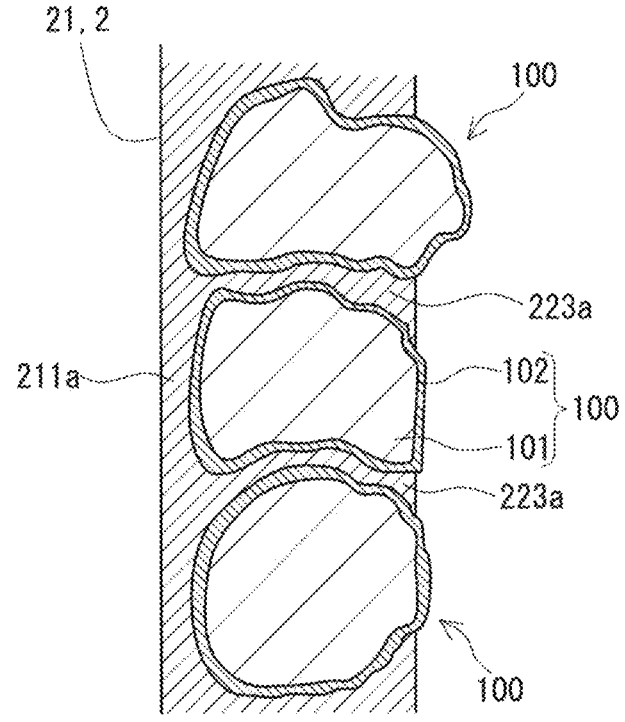
FIG. 4 is a schematic sectional view schematically showing the vicinity of a peripheral surface of the tooth included in the stator core according to the first embodiment.

When the temperature of the heat-treatment in the oxidizing atmosphere is 350° C. or more and the holding time is 5 minutes or more, oxide 223a as shown in FIG. 3 is formed between the coated particles in the vicinity of the surface of the powder compact, and oxide 211a as shown in FIG. 4 is formed on the entire surface of the powder compact. In particular, it is considered that oxide 223a is formed from the surface of the powder compact to a predetermined depth. The depth is the length along a direction perpendicular to the surface of the powder compact. The predetermined depth is, for example, 0.1 mm or more. The predetermined depth is further 0.15 mm or more, in particular 0.2 mm or more. The upper limit of the predetermined depth is, for example, 1.0 mm. In other words, the predetermined depth is 0.1 mm to 1.0 mm, further 0.15 mm to 0.8 mm, in particular 0.2 mm to 0.6 mm. When the temperature of the heat-treatment in the oxidizing atmosphere is 800° C. or less and the holding time is 60 minutes or less, it is possible to prevent the electrically insulating coating of the coated particles from being destroyed by the heat-treatment. Therefore, an increase in eddy current loss can be prevented. The temperature is further 400° C. to 750° C., in particular 450° C. to 700° C. The holding time is further 10 minutes to 45 minutes, in particular 15 minutes to 30 minutes.

The oxygen concentration in the oxidizing atmosphere may be 20,000 ppm or less. The oxygen concentration is expressed as a volume fraction.

When the oxygen concentration is 20,000 ppm or less, an increase in hysteresis loss due to oxidation is easily prevented. The oxygen concentration may be 500 ppm or more. When the oxygen concentration is 500 ppm or more, oxide 223a and oxide 211a described above are easily formed. The oxygen concentration is further 700 ppm to 10,000 ppm, 1,000 ppm to 7,500 ppm, and particularly 2,000 ppm to 5,000 ppm.

Figure 6:
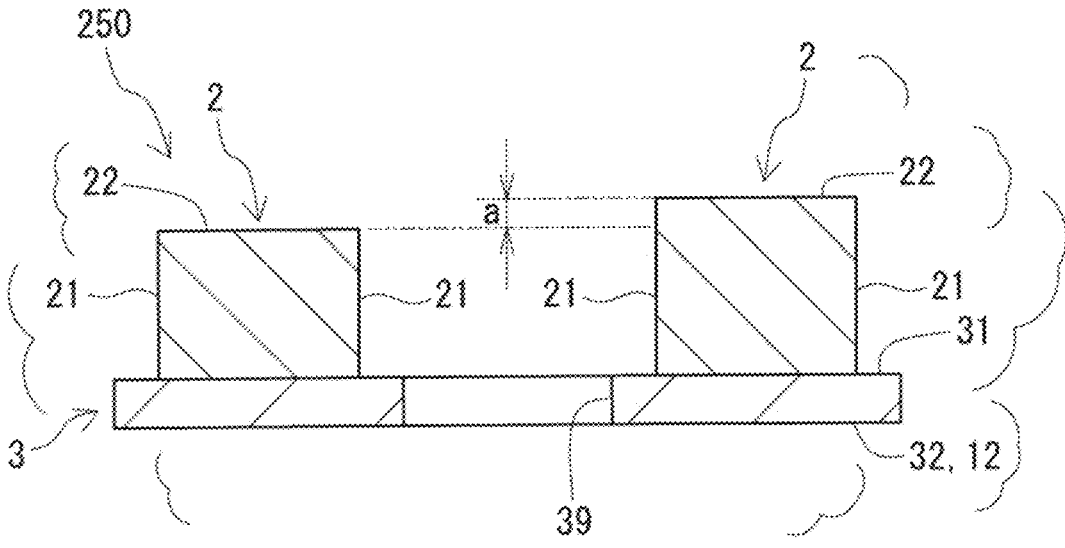
FIG. 6 is a schematic sectional view showing an example of a heat-treated body formed in a step B in the method of manufacturing a stator core according to the first embodiment.

FIG. 6 shows a heat-treated body 250. Heat-treated body 250 of FIG. 6 is formed by heat-treating powder compact 200 shown in FIG. 5. In heat-treated body 250 of FIG. 6, difference a described with reference to FIG. 5 is maintained. Oxide 211a as shown in FIG. 4 is provided on the entire surface of heat-treated body 250. Oxide 223a as shown in FIG. 4 is provided between coated particles 100 in the vicinity of the entire surface of heat-treated body 250.

[Step C]

Figure 7:
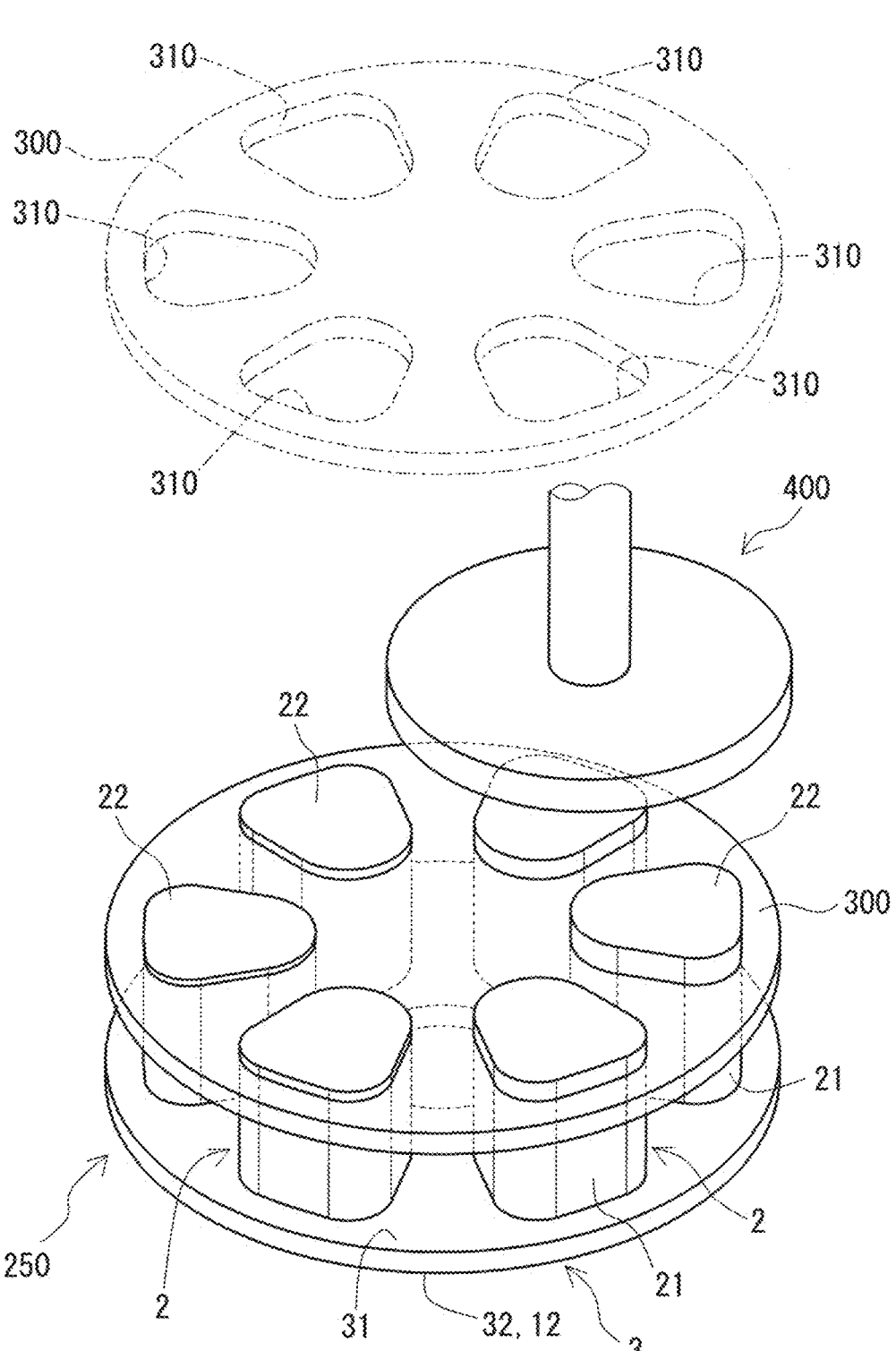
FIG. 7 is an explanatory view showing an example of a step C in the method of manufacturing of the stator core according to the first embodiment.

The grinding is performed by, for example, grinder 400 as shown in FIG. 7. The grinding may be surface grinding. Surface grinding tends to form planar first end surface 22 described with reference to FIG. 3.

As shown in FIG. 7, heat-treated body 250 described with reference to FIG. 6 is ground. The portion to be ground is at least first end surface 22 of each tooth 2. By grinding, the difference between a maximum value and a minimum value of first heights H1 can be more easily set to 0.02 mm or less. The grinding may also be performed on lower surface 32 of yoke 3. If lower surface 32 of yoke 3 is ground, the difference in first heights H1 can be more easily set to 0.02 mm or less. The grinding is not performed on peripheral surface 21 and upper surface 31.

When grinding is performed, the end portion of each tooth 2 near peripheral surface 21 may be fixed. The end portion of each tooth 2 is fixed using, for example, a plate-shaped member 300 as shown in FIG. 7.

Plate-shaped member 30) includes a plurality of through holes 310. Each through hole 310 is a hole into which the end portion of each tooth 2 can be inserted. The number of through holes 310 corresponds to the number of teeth 2. The hole shape of through hole 310 is similar to the shape of teeth 2. The size of through hole 310 can be appropriately selected to such an extent that the end portion of teeth 2 can be inserted therein and a gap with peripheral surface 21 is minute in a state where the end portion of teeth 2 is inserted therein. Each through hole 310 has the same shape and size.

Each through hole 310 fits into each tooth 2. The inner peripheral surface of each through hole 310 holds peripheral surface 21 in the vicinity of first end surface 22 of tooth 2. The grinding is performed in the held state. Fixing of plate-shaped member 300 is performed by grinding so that the difference between the maximum value and the minimum value of first heights H1 shown in FIG. 2 is 0.02 mm or less. FIG. 7 shows the exposed region from plate-shaped member 300 in each tooth 2 in an exaggerated manner for convenience of explanation. By fixing the vicinity of first end surface 22 of each tooth 2 with plate-shaped member 300, it is possible to prevent the vicinity of the edge line between first end surface 22 and peripheral surface 21 of each tooth 2 from being chipped due to grinding.

As described above, the height between first end surface 22 and lower surface 32 of the stator core formed at a position where powder feeding is started is likely to be higher than the height between first end surface 22 and lower surface 32 of the stator core formed at the position where the powder feeder turns back. For example, in FIG. 5, the height of the right tooth 2 is the highest, and the height gradually decreases toward the left tooth 2. Due to such a height difference, the machining amount of teeth 2 is the largest in tooth 2 located at the position where the powder feeding is started. The machining amount of tooth 2 decreases toward tooth 2 located at the position where the powder feeder turns back. In the grinding, plate-shaped member 300 may also be ground together.

First region 221 and second region 222 described with reference to FIG. 3 and grinding mark 25 described with reference to FIG. 1 are formed on ground first end surface 22. That is, the oxide formed on first end surface 22, electrically insulating coating 102 in the vicinity of first end surface 22, and metallic particles 101 are removed by grinding. Oxide 223a formed between coated particles 100 in the vicinity of first end surface 22 by the heat-treatment reduces plastic flow of metallic particles 101 in the vicinity of first end surface 22 due to grinding. By reducing the plastic flow, it is possible to reduce the number of portions where adjacent metallic particles 101 are connected to each other.

Oxide 211a described with reference to FIG. 4 is still formed on peripheral surface 21.

When lower surface 32 of yoke 3 is ground, although not shown, lower surface 32 has the similar configuration as first end surface 22.

Stator core 1 of the embodiment is easy to construct rotary electric machine 9 with low loss. In first end surface 22 of each tooth 2, adjacent metallic particles 101 are not connected to each other. In particular, when first end surface 22 includes third region 223, the gap between adjacent first regions 221 is maintained by third region 223. Therefore, stator core 1 can easily reduce the eddy current loss when rotary electric machine 9 is constructed. Moreover, in peripheral surface 21 of each tooth 2, the average thickness of layered oxide 211a is 10 μm or less. Therefore, stator core 1 can easily reduce the hysteresis loss when rotary electric machine 9 is constructed. Therefore, stator core 1 can easily reduce the loss of rotary electric machine 9.

Stator core 1 of the embodiment is easy to construct rotary electric machine 9 with small noise and vibration. The reasons are as follows. In stator core 1 in which a difference between the maximum value and a minimum value of first heights H1 is 0.02 mm or less, when rotary electric machine 9 shown in FIG. 11 is constructed, each gap b can be easily made uniform. Rotary electric machine 9 in which gap b is uniform can easily reduce the torque ripple. Rotary electric machine 9 having a small torque ripple has small noise and vibration. Therefore, stator core 1 can easily reduce noise and vibration of rotary electric machine 9.

In the method of manufacturing a stator core of the embodiment, stator core 1 of the embodiment can be manufactured through steps in a specific order of heat-treatment under specific conditions and then grinding. Oxide 211*a* is formed on the entire surface of powder compact 200 by the heat-treatment under specific conditions. In addition, oxide 223*a* may be formed between coated particles 100 in the vicinity of the surface of powder compact 200. By grinding after the heat-treatment, the vicinity of first end surface 22 of heat-treated body 250 is ground. It is considered that oxide 211*a* makes it easier to suppress the load due to sliding during grinding than in the case where oxide 211*a* is not provided. Therefore, even if electrically insulating coating 102 in the vicinity of first end surface 22 is damaged by the grinding, the plastic flow of metallic particles 101 accompanying the grinding is reduced. In particular, if oxide 223*a* is formed between coated particles 100, the plastic flow of metallic particle 101 in the vicinity of first end surface 22 due to the grinding is easily reduced by oxide 223*a*. Therefore, even if electrically insulating coating 102 covering metallic particles 101 in the vicinity of first end surface 22 is damaged and metallic particles 101 are exposed from electrically insulating coating 102, it is possible to prevent adjacent metallic particles 101 from being connected to each other. Also, peripheral surface 21 of heat-treated body 250 is not ground. Therefore, oxide 211*a* of peripheral surface 21 maintains the surface texture immediately after the heat-treatment even after the grinding. By grinding first end surface 22, the difference between the maximum value and the minimum value of first heights H1 can be reduced. Therefore, the method of manufacturing a stator core of the embodiment can manufacture stator core 1 having first end surface 22 and peripheral surface 21 and having the difference between the maximum value and the minimum value of first heights H1 of 0.02 mm or less. That is, according to the method of manufacturing a stator core of the embodiment, it is possible to manufacture stator core 1 capable of constructing an axial-gap rotary electric machine with low noise and vibration and low loss.

Second Embodiment

[Stator Core]

Figure 8:
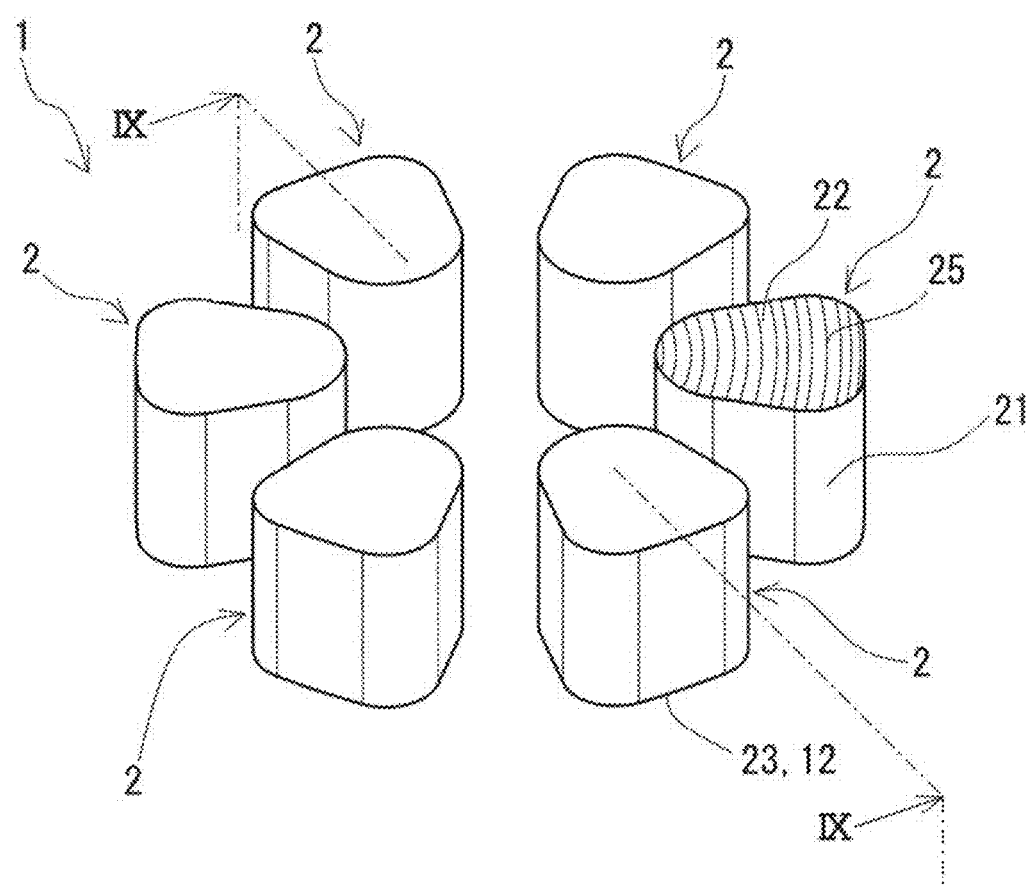
FIG. 8 is a schematic perspective view showing an example of a stator core according to a second embodiment.
Figure 9:
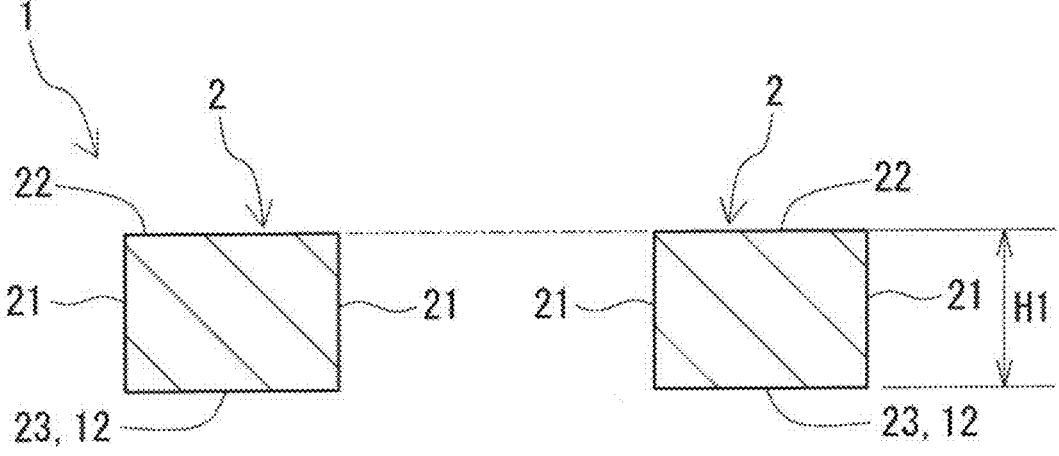
FIG. 9 is an IX-IX sectional view of a dust core of FIG. 8.

Stator core 1 according to the second embodiment will be described with reference to FIGS. 8 and 9. Stator core 1 of the embodiment differs from stator core 1 of the first embodiment in that stator core 1 does not include yoke 3 but includes a plurality of teeth 2. The following description will focus on differences from the first embodiment. Description of the same configuration as that of the first embodiment will be omitted.

Figure 12:
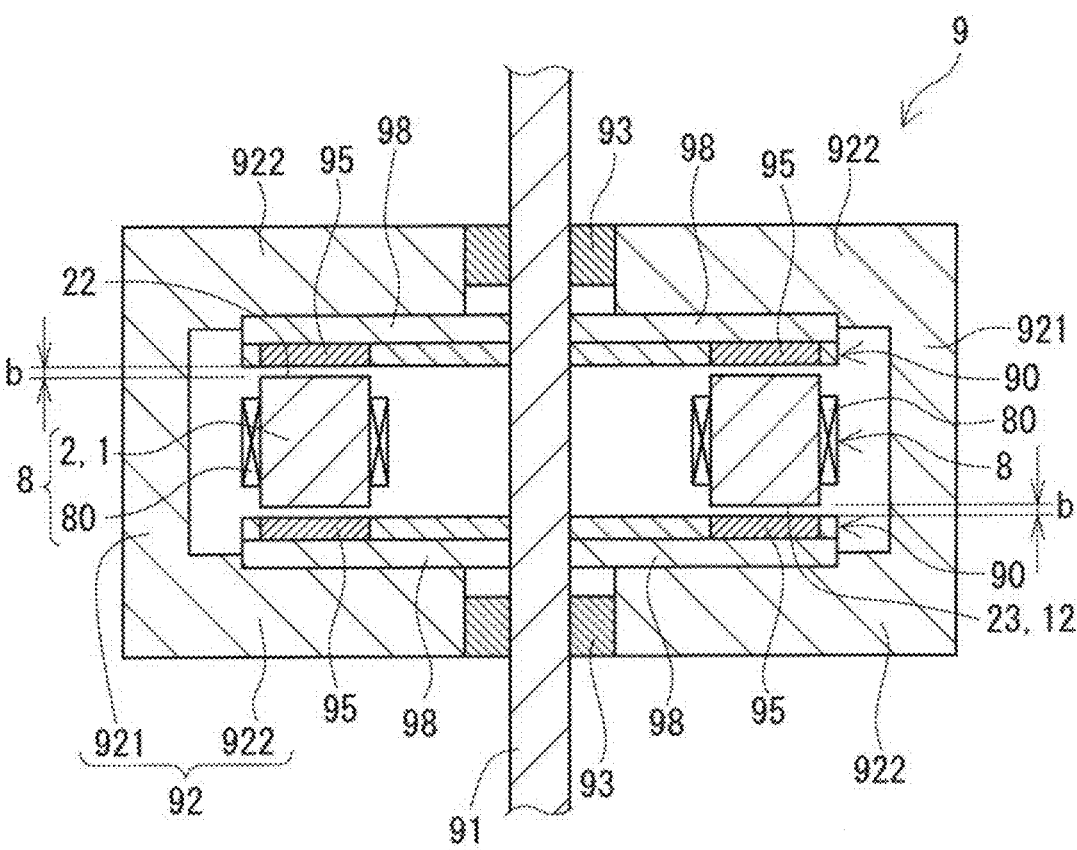
FIG. 12 is a schematic sectional view showing an example of a rotary electric machine according to a fifth embodiment.

Each tooth 2 includes peripheral surface 21, first end surface 22, and a second end surface 23. First end surface 22 is connected to the first end portion of peripheral surface 21. Second end surface 23 is connected to the second end portion of peripheral surface 21. Peripheral surface 21 and first end surface 22 are the same as in the first embodiment described above. Second end surface 23 may have the same configuration as first end surface 22, or may have the same configuration as peripheral surface 21. When it is ground, first end surface 22 and second end surface 23 have the same configuration. When it is not ground, peripheral surface 21 and second end surface 23 have the same configuration. First height H1 of the embodiment is the length between first end surface 22 and second end surface 23 as shown in FIG. 9. Also in the embodiment, the difference between the maximum value and the minimum value of first heights H1 is 0.02 mm or less. In stator core 1 in which the difference of first heights H1 is 0.02 mm or less, when rotary electric machine 9 which will be described later with reference to FIG. 12 is constructed, each gap b can be easily made uniform. The preferable range of the difference of first heights H1 is as described above.

In stator core 1 of the embodiment, it is easy to construct rotary electric machine 9 having a small torque ripple. Rotary electric machine 9 having a small torque ripple can easily reduce noise and vibration.

Third Embodiment

[Stator]

Stator 8 of the third embodiment will be described with reference to FIG. 10. Stator 8 of the embodiment includes stator core 1 of the embodiment 1 and a plurality of coils 80. Unlike the embodiment, stator 8 may include stator core 1 of the second embodiment and a plurality of coils 80. Each coil 80 is disposed at the outer peripheral of each tooth 2. Stator 8 is used in an axial-gap rotary electric machine.

Each coil 80 includes a tubular portion. The tubular portion is formed by spirally winding a wire. Coil 80 of the embodiment is a trapezoidal tubular edgewise wound coil. The winding is a coated flat wire. In FIG. 8, for convenience of explanation, only the cylindrical portion is shown and both end portions of the winding are not shown.

Stator 8 of the embodiment includes stator core 1 of the embodiment 1. By using stator 8, an axial-gap rotary electric machine with low loss can be obtained. By using stator 8, an axial-gap rotary electric machine with a small torque ripple can be obtained. By using stator 8, an axial-gap rotary electric machine with small noise and vibration can be obtained.

Fourth Embodiment

[Rotary Electric Machine]

Rotary electric machine 9 according to the fourth embodiment will be described with reference to FIG. 11. FIG. 11 is a sectional view taken along a plane parallel to a rotary shaft 91 of rotary electric machine 9. Rotary electric machine 9 of the embodiment is an axial-gap rotary electric machine. Rotary electric machine 9 can be used as a motor or a generator. Rotary electric machine 9 of the embodiment is a double-stator single-rotor rotary electric machine. Rotary electric machine 9 of the embodiment includes one rotor 90 and two stators 8. In rotary electric machine 9 of the embodiment, rotor 90 is sandwiched between stators 8 from both sides in the axial direction of rotary shaft 91. A gap is provided between rotor 90 and each stator 8. At least one of two stators 8 shown in FIG. 11 is stator 8 described in the third embodiment.

Stators 8 and rotor 90 are housed in case 92. Case 92 has a columnar internal space. Stators 8 and rotor 90 are housed in the internal space. Case 92 includes a cylindrical portion 921 and two plate portions 922.

Cylindrical portion 921 surrounds stators 8 and the outer periphery of rotor 90. Plate portions 922 are disposed on both sides of cylindrical portion 921. Stators 8 and rotor 90 are housed in case 92 so as to be sandwiched between two plate portions 922. Stators 8 are fixed to case 92 by fitting the outer peripheral surface of yoke 3 of stator core 1 into the step difference of plate portion 922 of case 92. A through hole is provided at the center of both plate portions 922. The through hole is provided with a bearing 93. Rotary shaft 91 is inserted through bearing 93. Rotary shaft 91 passes through case 92.

Rotor 90 includes a rotor body and at least one magnet 95. The rotor body supports magnet 95. The rotor body is a member of annular plate-like shape. The rotor body is rotatably supported with respect to case 92 by rotary shaft 91.

Magnet 95 is fixed to the rotor body. The number of magnets 95 may be one or more. When the number of magnets 95 is one, the shape of magnet 95 is an annular plate-like shape. In magnet 95, S poles and N poles are alternately arranged in the circumferential direction. When the number of magnets 95 is plural, the number of magnets 95 is the same as the number of teeth 2. The plurality of magnets 95 are arranged at equal intervals in the circumferential direction of the rotor body. Each magnet 95 has, for example, a flat plate shape. The planar shape of each magnet 95 is, for example, the same as the planar shape of first end surface 22 of tooth 2. Each magnet 95 is magnetized in the axial direction of the rotary shaft of rotor 90. The magnetization directions of magnets 95 adjacent to each other in the circumferential direction of the rotor body are opposite to each other. The rotating magnetic field generated by stator 8 causes magnets 95 to repeat attraction and repulsion with respect to each tooth 2, thereby rotating rotor 90.

Since rotary electric machine 9 of the embodiment includes stator 8 of the third embodiment, the loss can be easily reduced. In rotary electric machine 9, torque ripple can be easily reduced. Rotary electric machine 9 having a small torque ripple can easily reduce noise and vibration.

Fifth Embodiment

[Rotary Electric Machine]

Rotary electric machine 9 according to the fifth embodiment will be described with reference to FIG. 12. FIG. 12 is a cross section taken along a plane parallel to rotary shaft 91 of rotary electric machine 9, as in FIG. 11. Rotary electric machine 9 of the embodiment is different from rotary electric machine 9 of the fourth embodiment mainly in that rotary electric machine 9 of the embodiment is a single-stator double-rotor type axial gap motor including two rotors 90 and one stator 8. The following description will focus on differences from the fourth embodiment. The description of the same configuration as that of the fourth embodiment is omitted.

Rotary electric machine 9 of the embodiment includes one stator 8 and two rotors 90. In rotary electric machine 9 of the embodiment, one stator 8 is sandwiched between two rotors 90 on both sides of rotary shaft 91 in the axial direction. A gap is provided between stator 8 and each rotor 90. One stator 8 and two rotors 90 are housed in case 92 described in the fourth embodiment.

Each rotor 90 includes a rotor body, a plurality of magnets 95, and a back yoke 98. The rotor body and the plurality of magnets 95 are as described in the fourth embodiment above. Back yoke 98 is provided between rotor 90 and plate portion 922. Back yoke 98 is a member having an annular plate-like shape. Back yoke 98 is formed of a powder compact or a stacked steel plate similar to stator core 1 described above.

Stator 8 includes stator core 1 described in the second embodiment and a plurality of coils 80. Stator 8 includes a plurality of teeth 2 arranged annularly, coil 80 arranged at an outer peripheral of each tooth 2, and a support member for holding the plurality of teeth 2. The support member is not shown. Coil 80 is as described in the embodiment 3 above. The support member holds the plurality of teeth 2 so that intervals between teeth 2 are equal to each other. The teeth adjacent to each other in the circumferential direction do not come into contact with each other by the support member. The support member is fixed to case 92 so as not to rotate.

Since rotary electric machine 9 according to the fifth embodiment includes stator 8 having stator core 1 of the second embodiment, it is easy to reduce the loss similarly to rotary electric machine 9 according to the fourth embodiment. In rotary electric machine 9, torque ripple can be easily reduced. Rotary electric machine 9 having a small torque ripple can easily reduce noise and vibration.

<<Test>>

Differences in the magnitude of stator core loss due to differences in the method of manufacturing a stator core were evaluated. Two stator cores were prepared for each sample.

Sample Nos. 1 to 5

The stator cores of sample No. 1 to sample No. 5 were manufactured through step A to step C in order in the same manner as the method of manufacturing a stator core described above.

[Step A]

The raw material powder was compacted to form a powder compact having a predetermined shape. The raw material powder includes a plurality of coated particles. Each coated particle has a metallic particle made of pure iron and an electrically insulating coating made of iron phosphate and silica. The thickness of electrically insulating coating was 50 nm. The compacting pressure was either 441 MPa or 785 MPa as shown in Table 1. Similarly to powder compact 200 described with reference to FIG. 5, this powder compact is a compact in which the yoke with annular plate-like shape and the six columnar teeth with columnar shape are integrated.

[Step B]

The powder compact was heat-treated to form a heat-treated body. The atmosphere for the heat-treatment was an oxidizing atmosphere. The oxygen concentration in the oxidizing atmosphere was 500 ppm to 20,000 ppm in terms of volume ratio, as shown in Table 1. The temperature of the heat-treatment was 650° C. The holding time of the heat-treatment was 15 minutes.

[Step C]

The first end surface of each tooth of the heat-treated body was surface ground as described with reference to FIG. 7.

Sample Nos. 101 to 107

As shown in Table 1, the stator cores of sample Nos. 101 to 107 were manufactured in the same manner as sample No. 1 except for at least one of the magnitude of pressure in the step A, the type of atmosphere in the step B, and the absence of surface grinding in the step C. In the nitrogen atmosphere shown in Table 1, the oxygen concentration was 0 ppm.

[Relative Density]

The relative density of the dust core constituting the stator core of each sample was calculated by [(density of actual dust core/true density of dust core)×100] as described above. The results are shown in Table 1.

[Loss]

The stator core loss of each sample was examined. The two stator cores were set one above the other so that the first end surfaces of the respective teeth were in contact with each other. A pair of two teeth in which first end surfaces of the teeth are in contact with each other in a state in which two stator cores are set one above the other is called a bobbin. Any two bobbins were selected from the plurality of bobbins. A test component was formed in which a primary winding coil of 60 turns and a secondary winding coil of 30 turns were arranged on each bobbin. Losses were measured at a magnetic flux density of 1.0 T and a frequency of 1 kHz in a closed magnetic circuit configured in the formed test components. The results are shown in Table 1.

[First Height]

The difference between a maximum value and a minimum value of a first heights of a stator core of each sample was measured. A micrometer was used to measure each first equipped with a 0 grade surface plate was used. The stator core was placed on the surface plate so that the first end surface of the tooth faces upward. A plurality of measurement points was selected on the first end surface of each tooth. The measurement point was set on a straight line drawn so as to pass through the centroid of the first end surface and the center of the yoke when the stator core was viewed in a plan view. Three measurement points were selected on the straight line. The first measurement point was the centroid of the first end surface of tooth on the straight line. The second measurement point was the edge of the first end surface at a position close to the center of the yoke. The third measurement point was the edge of the first end surface at a position far from the center of the yoke. The parallelism between the lower surface of the yoke and each first end surface was an average value of lengths of straight lines connecting the surface plate and each measurement point among straight lines orthogonal to the surface plate. The results are shown in Table 1.

TABLE 1

|  |  | HEAT-TREATMENT | | |  |  | DIFFERENCE BETWEEN MAXIMUM VALUE AND MINIMUM |  | AVER- AGE | AVER- AGE THICK- |
| SAM- PLE No. | PRESSURE MPa | ATMOS- PHERE | OXYGEN CONCEN- TRATION (ppm) | SURFACE GRINDING | RELATIVE DENSITY % | LOSS W | VALUE OF FIRST HEIGHTS mm | PARAL- LELISM | DEPTH OF OXIDE μm | NESS OF OXIDE μm |
| --- | --- | --- | --- | --- | --- | --- | --- | --- | --- | --- |
| 1 | 785 | OXYGEN | 500 | WITH | 95.1 | 45 | 0.020 | 0.006 | 172 | 0.6 |
| 2 | 441 |  | 500 | GRINDING | 90.5 | 58 | 0.013 | 0.007 | 952 | 0.8 |
| 3 | 785 |  | 5000 |  | 95.1 | 45 | 0.020 | 0.010 | 418 | 3.5 |
| 4 |  |  | 10000 |  | 95.1 | 47 | 0.019 | 0.013 | 656 | 5.9 |
| 5 |  |  | 20000 |  | 95.1 | 50 | 0.019 | 0.015 | 933 | 7.8 |
| 101 |  | NITROGEN | 0 | WITHOUT | 95 | 43 | 0.173 | 0.150 | 0 | — |
| 102 | 392 |  | 0 | GRINDING | 89.9 | 56 | 0.121 | 0.108 | 0 | — |
| 103 |  | OXYGEN | 500 |  | 89.7 | 70 | 0.132 | 0.111 | 1030 | 1.0 |
| 104 |  |  | 500 | WITH GRINDING | 89.7 | 68 | 0.011 | 0.003 | 1030 | 1.0 |
| 105 | 441 | NITROGEN | 0 | WITHOUT GRINDING | 90.6 | 54 | 0.135 | 0.123 | 0 | — |
| 106 |  | OXYGEN | 500 | GRINDING | 90.5 | 58 | 0.133 | 0.120 | 952 | 0.8 |
| 107 | 785 | AIR |  | WITH GRINDING | 95.1 | 55 | 0.026 | 0.023 | 1047 | 11.0 | height. A plurality of measurement points were selected on the first end surface of each tooth. The measurement point was set on a straight line drawn so as to pass through the centroid of the first end surface and the center of the yoke when the first end surface was viewed in a plan view. Three measurement points were selected on the straight line. The first measurement point was the centroid of the first end surface. The second measurement point was the edge of the first end surface at a position close to the center of the yoke. The third measurement point was the edge of the first end surface at a position far from the center of the yoke. Each first height was a difference between a maximum value and a minimum value of a length of a straight line connecting the lower surface of the yoke and each measurement point among straight lines orthogonal to the first end surface. The difference between a maximum value and a minimum value of the first heights at the plurality of teeth was calculated. The results are shown in Table 1.

[Parallelism]

The parallelism between the lower surface of the yoke in the stator core and the first end surface of each of a plurality of teeth in each sample was measured. A height gauge As shown in Table 1, in the samples No. 1 to No. 5, the difference between the maximum value and the minimum value of the first height and the parallelism are small, and the loss was low.

In sample No. 101, sample No. 102, and sample No. 105 to sample No. 107, the difference between the maximum value and the minimum value of the first height and the parallelism were large although the loss was low. In sample No. 103, the difference between the maximum value and the minimum value of the first height, the parallelism, and the loss were all large. In Sample No. 104, the difference between the maximum value and the minimum value of the first height and the parallelism were small, but the loss was large.

[Surface Observation]

The first end surface and the peripheral surface of tooth in sample No. 1 to sample No. 5 were observed. Observation of the first end surface and the peripheral surface was performed by taking a cross section orthogonal to each surface.

Figure 13:
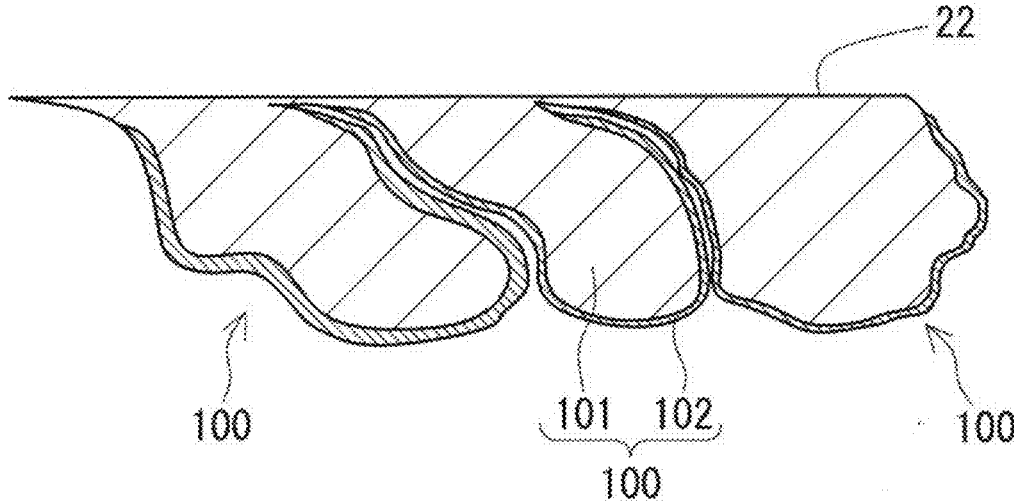
FIG. 13 is a schematic sectional view schematically showing a state in which portions where metallic particles are connected to each other are formed in the vicinity of a first end surface of a tooth in a stator core.

In the samples No. 1 to No. 5, the first end surface of the ground tooth was constituted by a surface as described with reference to FIG. 3. Specifically, the first end surface of the tooth had first region 221, second region 222, and third region 223 as shown in FIG. 3. Electrically insulating coating 102 of coated particle 100 was damaged. Since electrically insulating coating 102 was damaged, metallic particles 101 were exposed. Exposed metallic particles 101 were not connected to adjacent metallic particles 101. FIG. 13 is a schematic view showing a state in which portions where metallic particles 101 are connected to each other are formed. In the samples No. 1 to No. 5, it is considered that the loss was reduced because the portion where metallic particles 101 were connected to each other as shown in FIG. 13 was not formed.

In the samples No. 1 to No. 5, the peripheral surface of the tooth was constituted by a surface as described with reference to FIG. 4. Specifically, as shown in FIG. 4, layered oxide 211a covering the surface of the plurality of coated particles 100 was formed in the peripheral surface of the tooth. The compositions of oxide 211a and oxide 223a were analyzed with a TEM (JEM2100F) manufactured by JEOL Ltd. Oxide 211a and oxide 223a were oxides including constituent elements of metallic particle 101. Specific examples were $Fe_2O_3$ and $Fe_3O_4$. The average depth of oxide 223a in the peripheral surface of the tooth was determined as described above. The results are shown in Table 1. In all of sample No. 1 to sample No. 5, the average depth of oxide was 100 μm or more.

The average thickness of layered oxide 211a was determined as described above. The results are shown in Table 1. In each of sample Nos. 1 to 5, the average thickness of oxide 211a was 10 μm or less.

The present invention is not limited to these examples, but is defined by the scope of the claims, and is intended to include all modifications within the meaning and scope equivalent to the scope of the claims.

For example, although not illustrated, the rotary electric machine may be a single-stator single-rotor rotary electric machine. The rotary electric machine includes a rotor and a stator.

REFERENCE SIGNS LIST 1 stator core
12 second end surface
2 tooth
21 peripheral surface, 211a oxide
22 first end surface
221 first region, 222 second region
223 third region, 223a oxide
23 second end surface
25 grinding mark
3 yoke
30e outer peripheral surface, 30i inner peripheral surface
31 upper surface, 32 lower surface
39 shaft hole
8 stator, 80 coil
9 rotary electric machine
90 rotor, 91 rotary shaft
92 case, 921 cylindrical portion, 922 plate portion
93 bearing, 95 magnet, 98 back yoke
100 coated particle, 101 metallic particle, 102 electrically insulating coating
200 powder compact, 250 heat-treated body
300 plate-shaped member. 310 through hole
400 grinder
H1 first height, H2 second height
a difference, b gap

The invention claimed is:

1. A stator core configured to be used in an axial-gap rotary electric machine, the stator core comprising:
   a plurality of teeth with columnar shape arranged annularly,
   wherein the stator core has
      a peripheral surface of each of the plurality of teeth,
      a first end surface of each of the plurality of teeth,
      at least one second end surface that is a surface opposite to the first end surfaces,
   wherein each of the plurality of teeth is formed of a dust core,
   wherein the dust core includes a plurality of coated particles,
   wherein each of the plurality of coated particles includes
      a metallic particle made of a soft magnetic material, and
      an electrically insulating coating covering the metallic particle,
   wherein each of the first end surfaces has
      first regions formed of cross sections of the metallic particles, and
      second regions formed of the electrically insulating coatings between the first regions,
   wherein each of the peripheral surfaces is made of an oxide containing a constituent element of the soft magnetic material,
   wherein an average thickness of the oxide in each of the peripheral surfaces is 10 μm or less,
   when lengths between each of the first end surfaces and the second end surface are defined as a plurality of first heights, a difference between a maximum value and a minimum value of the plurality of first heights is 0.02 mm or less.

2. The stator core according to claim 1, further comprising:
   a yoke with annular plate-like shape,
   wherein the yoke has
      an inner peripheral surface,
      an outer peripheral surface,
      an upper surface connected to the inner peripheral surface, the outer peripheral surface, and the peripheral surfaces of the plurality of teeth, and
      a lower surface connected to the inner peripheral surface and the outer peripheral surface,
   wherein the lower surface is the second end surface, and
   wherein the yoke is formed of the dust core integrally formed with the plurality of teeth.

3. The stator core according to claim 1,
   wherein a parallelism between each of the first end surfaces of each of the plurality of teeth and the second end surface is 0.02 mm or less.

4. The stator core according to claim 1,
   wherein a relative density of the dust core is 90% or more.

5. The stator core according to claim 1,
   wherein each of the first end surfaces of each of the plurality of teeth has a third region between the second regions, the third region being made of the oxide containing the constituent element of the soft magnetic material, and
   wherein an average depth of each of the third regions is 100 μm or more.

6. The stator core according to claim 1,
   wherein the metallic particles are made of pure iron or an iron-based alloy, and
   wherein the iron-based alloy is an Fe—Si-based alloy, an Fe—Al-based alloy, or an Fe—Si—Al-based alloy.

7. A stator of an axial-gap rotary electric machine, the stator comprising:

the stator core according to claim 1; and coils disposed at each of the plurality of teeth.

8. An axial-gap rotary electric machine comprising:

the stator according to claim 7.

9. A method of manufacturing a stator core, the method comprising:

forming a powder compact by compacting a plurality of coated particles;

heat-treating the powder compact; and grinding the heat-treated powder compact, wherein each of the plurality of coated particles includes a metallic particle made of a soft magnetic material, and an electrically insulating coating covering the metallic particle, wherein the powder compact includes a plurality of teeth with columnar shape arranged annularly, wherein each of the plurality of teeth has a peripheral surface and a first end surface, wherein a pressure applied when the compacting is performed is 500 MPa or more, wherein the heat-treating is performed under a condition of a temperature of 350° C. to 800° C. in an oxidizing atmosphere, wherein an oxygen concentration in the oxidizing atmosphere is 20,000 ppm or less in terms of volume ratio, and wherein the grinding is performed on the first end surface of each of the plurality of teeth in the heat-treated powder compact and is not performed on the peripheral surface of each of the plurality of teeth.

10. The method of manufacturing a stator core according to claim 9, wherein the oxygen concentration in the oxidizing atmosphere is 500 ppm or more in terms of volume ratio.

11. The method of manufacturing a stator core according to claim 9, wherein the grinding is surface grinding.

* * * * *